3,351,428
PROCESS FOR THE PRODUCTION OF REFRACTORY HARD METAL MATERIALS
Leslie Titus, Campbell, and John R. Thornberry and Richard G. Breuer, Los Gatos, Calif., assignors to Kaiser Aluminum & Chemical Corporation, Oakland, Calif., a corporation of California
No Drawing. Filed Jan. 29, 1962, Ser. No. 169,670
10 Claims. (Cl. 23—204)

The present invention relates to the production of carbides and/or borides of metals and/or metalloids, mixtures of carbides and/or borides, and for the production of so-called "refractory hard metal" material. The term "refractory hard metal" material as commonly known in the art refers to high melting, hard substances which have a metallic nature but are, however, technically inorganic compounds. "Refractory hard metal" materials include the refractory carbides, borides, nitrides, silicides of metals in the fourth to sixth groups of the periodic chart. Among the more important substances of this type are the carbides and borides of titanium, zirconium, niobium, tantalum and hafnium.

Various methods have been proposed for the production of refractory hard metal powders. Metal borides and carbides, for example, have been produced by combining reactants and subjecting them to the action of an electric arc. Other methods for producing these materials have included electrolysis of fused baths and reactions between boron carbide or boric oxide and the refractory metal oxide and carbon to produce a boride and carbon monoxide.

Other reactions capable of performance on a commercial scale include the carbothermic reduction of the appropriate metal oxide to produce the carbide. These reactions which may be carried out at temperatures on the order of 2000° C., or considerably higher, may be performed under pressure or in a vacuum and sometimes it is desired to conduct the reaction in a protective atmosphere.

All of these methods when placed on a production basis involved problems which detracted from economical operation. Among the problems encountered is that introduced by the evolution of carbon monoxide gas. In the carbothermic reduction, the evolution of carbon monoxide takes place rapidly and expels solid material into the furnace cavities or out one of the ends of the furnace, thereby congesting the furnace passageway and decreasing the yield.

An additional problem encountered is in the heat transfer between the reaction furnace and the reaction materials to obtain most efficient and economic utilization of heat. When the reactant materials have been previously compacted into a cylindrical shape and the cylindrical body passed through a heating zone in a furnace, the chemical reactions take place from the outside toward the center of the cylindrical shape. This occurs because the heating source generally comprises a heating tube which surrounds the reaction area and generates heat from the outside toward the center of the body disposed within the heating tube. As a result of the transfer of heat from the outside toward the center, the reaction occurs first at the outside or periphery of the cylindrical shape and last at the center. This lag in heat transfer may create undesirable effects during the reaction of the materials.

Still another problem encountered results from the solubility of reactants since the reactant materials generally involve the use of a wetting agent to maintain the reactants in admixture and in a suitably compacted mass. For example, water is a generally preferred wetting agent because it is inexpensive and readily available, however, the relatively expensive reactant, $B_2O_3$, is partially soluble in the water binder. Thus, as the solvent is removed in drying, the $B_2O_3$ migrates toward the surface of the reactant mass and results in segregation of the feed ingredients. In addition, some of the $B_2O_3$ is lost by volatilization resulting in non-stoichiometry of the mixture which will cause a decrease in the quality of the product.

Applicants have discovered that high melting refractory substances of the type decribed may be produced in an economical and efficient operation, adaptable to continuous production, and which avoids the above described problems of gas evolution, heat transfer behavior, and solubility of reactants.

According to the present invention, a process is proposed whereby the reactant ingredients are prepared in the form of an elongated body having a coaxial hole of a cross-sectional area sufficient to ensure the passage of gaseous products such as carbon monoxide, etc. from the reactant mass without disruption of the reactant materials and while permitting treatment of a sufficient quantity of material to render the process economical. In the process according to the present invention no significant segregation or undesirable deviation from stoichiometry among the reactant materials occurs. In addition, the removal of carbon monoxide gas is accomplished for the most part through the central passage way provided in the elongated body. Furthermore, the heat transfer conditions allow the maximum production of refractory material such that large quantities of high quality refractory material powders may be obtained. All these advantages are obtained when the cross-sectional area of the passageway is from 0.04 to 0.75 times the total cross-sectional area of the shaped solid mass plus passageway.

The most efficient method for the production of refractory material of the types described involves the compaction of the reactant materials into a reaction mass having an elongated, cylindrical configuration. This is so because cylindrically shaped bodies are easiest to manufacture. It has been discovered that the process may be made more economical and efficient by providing a coaxial hole within the cylindrical body which has a cross-sectional area of from 0.04 to 0.75 times the total cross-sectional area of the cylindrical shape, preferably 0.04 to 0.5. If the passageway is outside this upper limit, the amount of material undergoing reaction is insufficient to provide efficient and economical operation. Similarly, if the passageway is below the lower limit the advantage of providing the coaxial hole is lost inasmuch as the heating from the outside to within is insufficiently improved. Moreover, with a coaxial hole of insufficient diameter size, gas generated during reaction is not easily removed and the problems of destruction of the compacted reactant mix will occur. Further, the problems of solubility of reactants and segregation are avoided by using binder material, where necessary, which is not a solvent for any of the reactants.

As an example of a method of the invention employed to produce titanium boride powders, $TiO_2$, $B_2O_3$, and carbon, are mixed together in the following proportions: 100 parts by weight $TiO_2$, 92 parts by weight $B_2O_3$ and 75 parts by weight carbon. The reactants are mixed together with a small amount of kerosene which serves as a "non-solvent" binder for the reaction mix. The reaction mix is then extruded into an annular, cylindrical shape about 6" long and having a passageway of about 0.1 times the total cross-sectional area of the cylindrical extruded body. The extruded shape is then subjected to reaction temperatures in the range of 1850–2250° C. Because some of the $B_2O_3$ reactant will be lost through volatilization during reaction, it is preferable to provide the boric oxide present in a slight excess of the stoichiometric requirements. Generally, a 5% excess boric oxide will be sufficient to ensure complete boride formation. However, as a result of the excess boric oxide in the reaction mass, a small amount remains in the reaction products. The boric oxide remaining in the reaction products is readily removed by leaching with a water solution. Although boric oxide is soluble in cold water, leaching in hot water is preferred to effect complete and rapid removal of the $B_2O_3$ from the boride product. Titanium boride powders made according to the invention will be of a purity greater than 95% titanium boride, with the remainder titanium carbide and/or incidental impurities.

The extruded mass of reactants can advantageously be passed through the high temperature heating zone necessary for the reaction, by being placed in graphite boats or other containers or disposed within tubular graphite sleeves. A conventional horizontal, vertical, or inclined tube furnace may be employed. The process is adapted for continuous operation by placing the compacted mass inside the tubular graphite sleeve and arranging a plurality of the loaded sleeves in tandem so that they may be successively pushed through the heating zone. The graphite sleeves containing the reaction product leaving the furnace may be allowed to cool in a cooling area adjacent to the exit of the horizontal tube furnace. The cooling may be performed in an inert or protective atmosphere.

Carbon monoxide gas is evolved during the reaction of the metal oxide, boric oxide and carbon, and escapes from the compacted mass largely through the passageways within the elongated body. The gases so evolved may be withdrawn from the tubular furnace by a suitably provided flue.

The reaction mixture may be formed into a shape having a central passageway by any suitable forming procedure. For example, in addition to extruding the reaction mixture into the desired shape as described in the above example, the mixture may be ram packed, tamped, compacted by vibration, etc. into a hollow shape.

As further illustration of the invention, powdered $B_4C$, $TiO_2$ and lampblack are mixed together in a ball mill. The powder mixture is then packed into graphite thimbles so as to provide a central passageway of 0.28 times the total cross-sectional area of the hollow shaped mass plus passageway (solid portion plus passageway). The loaded thimble is charged into a furnace and the charge treated to a reaction temperature range of 2150–2200° C., and titanium boride product removed.

In another example, a mixture of $ZrO_2$, $B_2O_3$ and C is prepared and extruded into a hollow shape having a central passageway of 0.04 times the total cross-sectional area of the solid hollow shape plus passageway. The shaped reaction mixture is subjected to reaction conditions and zirconium boride is produced of greater than 95% purity.

The process of the invention has the advantage that the reactant mass is uniformly heated throughout by virtue of the increased heat transfer efficiency provided by the annular shape of the reaction mass. Furthermore, when the shape is made by packing, e.g. ramming, as indicated above, the passageway provides a ready exit for the gases evolved during reaction so that the gases need not unnecessarily pass through the reaction mix and cause the reaction mix to disintegrate with the expelling of the dust material and consequent congesting of the furnace passageway which would tend to decrease efficiency and yield. The heating, which takes place radially toward the center of the cylindrical feed form, is uniform and efficient because of the absence of the central difficultly heated portion.

By using a binder material which is not a solvent for any reactant, e.g., $B_2O_3$, the problems of segregation of the soluble reaction ingredient is minimized. Since none of the material is dissolved in the binder there is no danger that the reactant will be removed from the intimate mixture and migrate to the surface of the extrusion upon drying and evaporation of the binder solvent. Thus, the mass of the extrusions will be essentially free of segregation of the reaction ingredients. By preserving the predetermined stoichiometric relationship of the reaction ingredients, the quality of the product may be consistently maintained at a high level.

Although the description of the invention is presented by reference to the production of titanium boride, it is understood that such features and details, with appropriate modifications, are also applicable to production of other refractory compounds and materials described above, and that the present invention is, accordingly, not restricted to the specific examples herein provided. The following chemical reaction equations are illustrative of some other materials which may be produced according to the invention.

$$TiO_2 + B_2O_3 + 5C \rightarrow TiB_2 + 5CO$$
$$TiO_2 + 2H_3BO_3 + 5C \rightarrow TiB_2 + 5CO + 3H_2O$$
$$2B_2O_3 + 7C \rightarrow B_4C + 6CO$$
$$4H_3BO_3 + 7C \rightarrow B_4C + 6CO + 6H_2O$$
$$TiO_2 + 3C \rightarrow TiC + 2CO$$
(also, the hydrated form of $TiO_2$)
$$Cr_2O_3 + 2B_2O_3 + 9C \rightarrow 2CrB_2 + 9CO$$
$$ZrO_2 + B_2O_3 + 5C \rightarrow ZrB_2 + 5CO$$

In each of the above cases the reactants are combined together and prepared in the form of a self-supporting, solid reaction mass having a hollow configuration and having a passageway with a cross-sectional area from 0.04 to 0.75 times the total cross-sectional area of the shaped mass plus passageway.

It is apparent that various changes and modifications may be made without departing from the invention wherein what is claimed is:

1. In the process for the production of a high melting, refractory hard metal material consisting essentially of at least one of the compounds selected from the group consisting of the carbides of titanium, zirconium, tantalum, niobium, hafnium and boron, and the borides of titanium, zirconium, tantalum, niobium and hafnium, comprising preparing a reaction mass into a self-supporting body from a mixture of at least one oxide from the group consisting of the oxides of titanium, zirconium, tantalum, niobium, hafnium and boron, with carbon, passing the self-supporting body through a heating zone and removing reaction products from the heating zone, the improvement which comprises:

(a) forming the reaction mass into a self-supporting hollow-shaped body with a central passageway having a cross-sectional area of from 0.04 to 0.75 times the total cross-sectional area of the shaped solid body plus passageway, whereby CO gas formed during reaction may be readily exited through said central passageway.

2. In the process for the production of a high melting, refractory hard metal material consisting essentially of at least one of the compounds selected from the group consisting of the carbides of titanium, zirconium, tantalum, niobium, hafnium and boron, and the borides of titanium, zirconium, tantalum, niobium and hafnium, comprising preparing a reaction mass into a self-supporting, solid, cylindrical shape from a mixture of at least one oxide from the group consisting of the oxides of titanium, zirconium, tantalum, niobium, hafnium and boron, with carbon, passing the self-supporting mass through a heating zone and removing reaction products from the heating zone, the improvement which comprises:

(a) forming the reaction mass into a self-supporting solid, annular, cylindrical shape with a central passageway having a cross-sectional area of from 0.04 to 0.75 times the total cross-sectional area of the solid cylindrical shape plus passageway, whereby CO gas formed during reaction may be readily exited through said central passageway.

3. In the process for the production of powder of a refractory hard metal boride of an element selected from the group consisting of titanium, zirconium, tantalum, niobium and hafnium, comprising preparing a reactant mixture of an oxide of the selected element, boric oxide and a carbonaceous material, forming the mixture into a self-supporting shaped body, and passing the shaped body of reactant mixture through a heating zone maintained at a temperature to effect a carbothermic reduction of the oxide, and removing reaction products from the heating zone, the improvement which comprises:

(a) forming the mixture into a self-supporting hollow-shaped body with a central passageway having a cross-sectional area of from 0.04 to 0.75 times the total cross-sectional area of the shaped solid body plus passageway, whereby CO gas formed during reaction may be readily exited through said central passageway.

4. In the process of producing metal boride powder of at least 95% purity comprising preparing a mixture of at least one metal oxide, boric oxide, and carbonaceous material, forming the mixture into a self-supporting cylindrical body, passing the self-supporting body through a heating zone to effect the production of metal boride, and removing reaction products from the heating zone, the improvement which comprises:

(a) forming the mixture into a self-supporting, annular cylindrical body having a central passageway of from 0.04 to 0.75 times the total cross-sectional area of the solid cylindrical shape plus passageway whereby CO gas formed during reaction may be readily exited through said central passageway.

5. A process according to claim 1 wherein kerosene is mixed with the reactants to facilitate shaping.

6. A process according to claim 2 wherein kerosene is mixed with the reactants to facilitate shaping.

7. A method according to claim 4 wherein said self-supporting annular cylindrical body is loaded with a tubular graphite sleeve and said loaded sleeve is passed through said heating zone.

8. A method according to claim 4 wherein kerosene is mixed with the reactants to facilitate shaping.

9. A method according to claim 4 wherein said boric oxide is provided in an excess of the stoichiometric requirement and a metal boride product produced is water leached to remove any of the excess boric oxide remaining in the product.

10. A method according to claim 4 wherein said passageway is preferably 0.04 to 0.5 times the total cross-sectional area of the solid shape plus passageway.

References Cited

UNITED STATES PATENTS

| | | | |
|---|---|---|---|
| 1,787,749 | 1/1931 | Heyroth | 23—156 |
| 2,957,754 | 10/1960 | Nicholson | 23—204 |
| 3,004,830 | 10/1961 | Orne | 23—204 |
| 3,013,862 | 12/1961 | May | 23—204 |
| 3,121,617 | 2/1964 | Amstein | 23—204 |

OSCAR R. VERTIZ, *Primary Examiner.*

H. S. MILLER, *Assistant Examiner.*